United States Patent [19]

Shiba et al.

[11] 3,865,598

[45] Feb. 11, 1975

[54] PHOTOGRAPHIC SILVER HALIDE EMULSIONS

[75] Inventors: Keisuke Shiba; Masanao Hinata; Hiroyuki Amano; Hiroshi Hara, all of Kanagawa, Japan

[73] Assignee: Fuji Photo Film Co., Ltd., Kanagawa, Japan

[22] Filed: Nov. 10, 1971

[21] Appl. No.: 197,398

[30] Foreign Application Priority Data
Nov. 11, 1970  Japan............................... 45-99336

[52] U.S. Cl.................... 96/125, 96/100, 96/108, 96/110
[51] Int. Cl. ...... G03c 1/08, G03c 1/40, G03c 1/28, G03c 1/30
[58] Field of Search ............ 96/125, 134, 135, 136, 96/137, 108, 94, 110, 138, 100

[56] References Cited
UNITED STATES PATENTS

| | | | |
|---|---|---|---|
| 2,816,029 | 12/1957 | Jones .................................... | 96/125 |
| 2,819,964 | 1/1958 | Jones .................................... | 96/125 |
| 2,843,490 | 7/1958 | Jones .................................... | 96/125 |
| 3,501,305 | 3/1970 | Illingsworth ......................... | 96/108 |
| 3,628,960 | 12/1971 | Philippaerts et al. .................. | 96/94 |
| 3,655,394 | 4/1972 | Illingsworth.......................... | 96/94 R |
| 3,660,100 | 5/1972 | Heeks et al. .......................... | 96/108 |
| 3,705,034 | 12/1972 | McNamara ......................... | 96/94 R |

*Primary Examiner*—Norman G. Torchin
*Assistant Examiner*—Richard L. Schilling
*Attorney, Agent, or Firm*—Sughrue, Rothwell, Mion, Zinn & MacPeak

[57] ABSTRACT

Green sensitized silver chlorobromide emulsions containing a J-band sensitization type dye are improved by adding specific amounts of a water soluble iodide or bromide to the emulsion.

12 Claims, 1 Drawing Figure

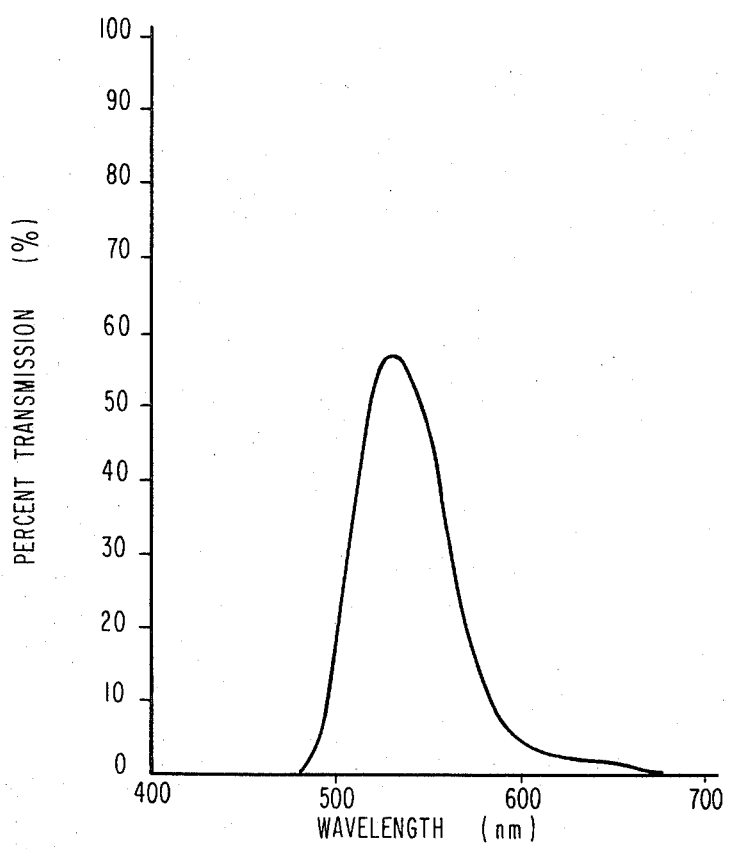

PHOTOGRAPHIC SILVER HALIDE EMULSIONS

BACKGROUND OF THE INVENTION

1. Field of the Invention

The present invention relates to photographic silver halide emulsions. In more detail, the present invention relates to silver halide emulsions containing a "J-band sensitization type dye", and especially to an improvement in silver halide emulsions containing a J-band sensitization type dye suitable for green sensitization.

2. Description of the Prior Art

It is known, e.g., see F. M. Hamer: Cyanine dyes and related Compounds; 710 (1964) (published by Interscience), that sensitization maximums by various sensitizing dyes is silver halide emulsions (M-band sensitization maximums by molecular absorption) are in a slightly longer wavelength than the absorption maximum of the dye in an aqueous solution, but are very close.

Certain kinds of sensitizing dyes show a sharp sensitization band at a somewhat longer wavelength (approximately 25 – 50 mm) than the M-band sensitization maximum wavelength. This phenomenon is known as J-band sensitization. Hereinafter, sensitizing dyes which show J-band sensitization refers to J-band sensitization type dyes.

In general, photographic sensitizing dyes are divided into those which provide effective M-band sensitization in silver halide emulsions and those which provide effective J-band sensitization. There are many kinds of dyes which show J-band sensitization. Since it is very tedious to describe the chemical structures thereof one by one, these dyes are described hereinafter as J-band sensitization type dyes.

It is well known that the intensity of the J-band sensitization is influenced by the chemical structure of the sensitizing dye and the characteristics of the emulsions, for example, the composition of the silver halide, the crystal form of silver halide, the silver ion concentration in the emulsion and the pH. Furthermore, the intensity of the J-band sensitization is affected by segmentation agents, stabilizers, coating aids or couplers coexisting in the emulsion. In many cases, compounds other than J-band sensitization type dyes added to the emulsion function to weaken J-band sensitization.

The present invention, deals with comparatively high contrast (i.e. high γ-value) sensitive elements, namely those except low contrast sensitive elements, having a comparatively high sensitivity. Such sensitive elements include, for example, black and white printing sensitive elements (monochromatic printing paper), color printing sensitive elements (for example, color printing paper and color positive film), high contrast sensitive elements for copying, sensitive elements for printing plates and high contrast sensitive elements for televisions.

It is well known that silver halide emulsions with a green-sensitive layer and a red-sensitive layer in a color photographic multi-layer element are used after spectral sensitizing. It is also known that the use of the following layer arrangement which improves sharpness is prefered for the color multi-layer elements, especially color printing multi-layer sensitive elements and particularly color positive films: A blue sensitive layer is situated adjacent to a support; a green-sensitive layer and a red-sensitive layer having a substantially lower sensitivity than that of the blue-sensitive layer are coated thereover; each sensitive silver halide layer contains a color coupler which forms an image having a complementray color to the sensitivity of the multilayers. In this case, the blue-sensitivity of the green sensitive layer is lower than the blue sensitivity of the blue-sensitive layer, though it is similar to that of the red sensitive layer (in common color paper or color positive films, the blue sensitivity of the green-sensitive layer is one-tenth or so of that of the blue sensitive layer).

In color printing sensitive elements, it is usually necessary to obtain high contrast images with low fog and stain. Considering these requirements, an AgBrI emulsion and a silver chloride emulsion are not suitable as silver halide emulsions for the green sensitive layer. The silver iodide bromide emulsion has a low developing rate and a low contrast as compared with a silver chloride emulsion or a silver chloride bromide emulsion. Besides the preparation of a silver iodide bromide emulsion require a long washing step prior to chemical ripening (or second ripening) because chemical ripening is difficult without long washing. On the other hand, a silver chloride emulsion has the fault that development proceeds too rapidly and the emulsion is easily fogged as compared with the silver chloride bromide emulsion. Accordingly, the silver chloride bromide emulsion is more prefered in a printing sensitive elements.

It is also known that the spectral sensitization of a green sensitive layer of a color multilayer element is advantageously carried out using J-band sensitization sence selective sensitization is afforded thereto. J-band sensitization is effective in the green sensitive layer of the color printing sensitive element to provide good color separation and good processing under a safelight.

In color printing sensitive elements and black and white sensitive elements, strict standards are required for residual colors caused by the sensitizing dyes, stains and fogs.

Though the silver chloride bromide emulsion is advantageous for high contrast sensitive elemtnts, especially the printing sensitive element, because of its rate of development, fog and gradation as described above, it has the fault that J-band sensitization thereof is difficult with J-band sensitization type dyes.

Many attempts have been made to remove this fault, e.g., many super sensitizing agents for intensifying J-band sensitization have been examined. However, good effects are barely observed in dyes which are useful for intensifying J-band sensitization. For example, a cyanine dye having the following formula (which is not a quaternary salt if it coexists with color couplers) is little improved by supersensitizing agents.

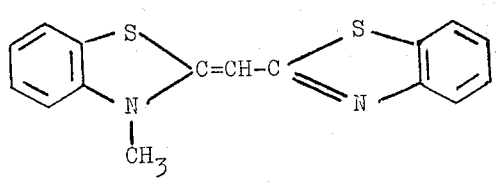

Sensitizing dyes which show a high J-band sensitization in silver chloride bromide emulsions have thus been the object of an intensive search by the art.

When oxacarbocyanine dyes represented by the following formula (wherein at least one of G and G' is a chlorine atom) are added to a silver chloride bromide emulsion though there is low residual coloring caused by the dye after treatment, J-band sensitization is difficult to cause, and weak J-band sensitization is exhibited at very high addition amounts. Spectral sensitization is thus hardly practised because of destruction of the J-band when coexisting with color couplers. However, a dye wherein both G and G' are phenyl group shows a high J-band sensitization in the presence of couplers. It has a fault that residual coloring after treatment caused by the dye is large.

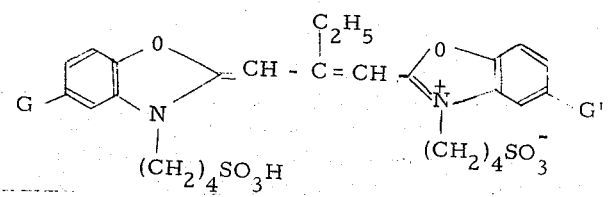

It is known that the J-band sensitization of streptocyanine dyes is strengthened by adding potassium iodide or potassium bromide to the silver chloride bromide emulsion, i.e., see Photo. Sci. Eng., 13(1) 13 – 17. However, the streptocyanine dyes described in the above-mentioned literature are for sensitizing to wavelength of less than 500 mm, and are not suitable for sensitization of the green sensitive range. Moreover, by addition of potassium iodide or potassium bromide while the J-band sensitization is strengthened, gradation and low contrast suffer and fog is caused. Further, the stability of the emulsions in which potassium iodide or potassium bromide is added deteriorates with lapse of time. Especially, with potassium iodide the sensitivity deteriorates with time.

SUMMARY OF THE INVENTION

It is the principal object of the present invention to provide a green sensitized photographic silver halide emulsion containing J-band sensitization type dyes, wherein low contrast thereof is not encountered by the addition of a water soluble iodide and/or water soluble bromide.

Another object of the invention is to provide a sensitive element with an emulsion layer which does not suffer from lowering of the sensitivity thereof during the passage of time.

These and other objects of the present invention are accomplished by incorporating in a silver chlorobromide emulsion, to increase the J-band sensitization thereof, a water soluble iodide and/or a water soluble bromide. As an example the J-band sensitization is advantageously increased by adding a water soluble iodide or a water soluble bromide to a silver chloride bromide emulsion containing a J-band sensitization type dye in an amount of 0.005 – 0.10 moles of the water soluble iodide per mole of the silver chloride component in the silver chloride bromide emulsion. The $I^-/AgCl$ (molar ratio) and 0.01 – 0.20 moles of water soluble bromide per one mole of the silver chloride component The $Br^-/AgCl$ (molar ratio).

The low contrast is not brought about by the addition of the water soluble iodide or water soluble bromide and lowering of the sensitivity of the silver halide sensitive element composed of said emulsion layers is scarcely observed with passage of time.

When the $I^-/AgCl$ molar ratio is less than 0.005 or the $Br^-/AgCl$ molar ratio is less than 0.01, though the J-band sensitization is strengthened, its effect is small. Moreover, lowering of sensitivity with time is large.

On the other hand, when the $I^-/AgCl$ molar ratio is higher than 0.10 or the $Br^-/AgCl$ molar ratio is more than 0.20, the gradation of the sensitive element composed of the emulsion layers yields low contrast and the lowering of the sensitivity with time becomes large, though J-band sensitization is seen.

BRIEF DESCRIPTION OF THE DRAWING

The drawing is a spectral transmittance curve of a filter.

DETAILED DESCRIPTION OF THE INVENTION

In order to attain the objects of the present invention, the time of addition of the water soluble iodide or water soluble bromide is a particularly important matter, i.e., it is effective to add them to the emulsion not prior to substantial completion of chemical ripening and especially prefered to add them after substantial completion of chemical ripening to be followed by the addition of sensitizing dyes. On the other hand, if they are added marely after conclusion of the physical ripening, but during chemical ripening, the sensitive element has a low contrast, though the J-band sensitization is strengthened, and consequently it is difficult to use.

Either the water soluble iodide or the water soluble bromide the water-solubility of which is greater than $10^{-3}$ mol/l can be used in the present invention. Typical water soluble salts used include iodides and bromides of ammine, alkalimetal and alkaliearth metal such as ammonium, potassium, lithium, sodium, cadmium and strontium.

The amount of AgBr in the preferred photographic emulsions of the high contrast sensitive element is from about 15 to about 95% and preferably from 30 to 90% (molar values).

The particle size of the silver halide used in the silver chloride bromide emulsions used of the present invention is not limited and can be of a size within ranges used in common prior art photographic emulsions. However, an average particle size by number less than 0.6 $\mu$ is especially prefered for use in high contrast sensitive elements. As the silver halide particles, regular particles, i.e. particles having no twin planes, and/or irregular particles may be used. However, regular particles are more effective in the present invention. Further, though emulsions which are not monodispersed may be used in the present invention, monodispersed emulsions are preferably used.

The J-band sensitization is increased by adding the water soluble iodide or the water soluble bromide to silver chloride bromide emulsions containing a J-band sensitizing type dye in the above-mentioned amount. Not only does the sensitivity increase in an unexpectedly high degree remain high with the passage of time, but the following characteristics are also provided.

It is possible to lower residual coloring after treatment of the sensitive element composed of emulsions containing J-band sensitization dyes since sufficient J-band sensitization is obtained by adding a small amount of the J-band sensitization dyes to the emulsions in view of the unexpected great increase of the J-band sensitization.

By strengthening the J-band sensitization, green sensitzed emulsions which show little lowering of sensitivity in the presence of color couplers can be obtained, which final special use for the green sensitization of color print sensitive elements.

Additives used for improving the physical properties of gelatin emulsion films, for example, vinyl polymer dispersions produced by using an anionic surface active agent, as are known from British Pat. No. 1,186,699 etc., formerly function to interrupt J-band sensitization. However, in the present invention, the J-band sensitization of emulsions containing the water soluble iodide or water soluble bromide is hardly affected by these dispersions.

Compounds used as flocculating agents are known, for example, from Jap. pat. Pub. No. Sho.40-27470 (Dec. 3, 1965) a U.S. Pat. No. 2,489,341 and British Pat. No. 1,135,622. These flocculating agents usually interrupt J-band sensitization. The J-band sensitization of emulsions containing the water soluble iodide or water soluble bromide used in the present invention is hardly affected by these flocculating agents.

Compounds used as fog inhibitors or stabilizers such as benzotriazole, nitrobenzimidazole, 5-nitroimidazole, mercaptans and 5-methyl-7-hydorxy-1,34-triazaindolizine usually function to interrupt J-band sensitization. However, the J-band sensitization of emulsions containing the water soluble iodide or water soluble bromide used in the present invention is hardly affected by these compounds.

Azo dyes used for silver-dye bleaching methods as described in Jap. Pat. Pub. No. Sho 36-10280, Sho 39-9587 and Sho 39-25768 usually function to interrupt J-band sensitization. However, the J-band sensitization of emulsions containing the water soluble iodide or water soluble bromide used in the present invention is hardly affected by these azo dyes.

Any dye which exhibits J-band sensitization can be effectively used in the present invention. J-band sensitization type dyes suitable for green sensitization most preferably used in the present invention have the following formulae (I), (II), (III), (IV), (V), and (VI):

acetoxyl group etc., carbalkoxy group, e.g., carbethoxy group etc., or alkoxycarbonylamino group, e.g., ethoxycarbonylamino group etc;

$Y_2$ and $Y_5$ can each represent a hydrogen atom, lower alkyl group, e.g., methyl group, ethyl group etc., halogen atom, e.g., chlorine atom, bromine atom, fluorine atom etc., hydroxyl group, alkoxy group e.g. methoxy group of ethoxy group, amino group, e.g., amino group and methylamino group, acylamido group, e.g., acetamido group etc., acyloxyl group, e.g., acetoxyl group etc., carbalkoxy group, e.g., carbethoxy group etc., alkoxycarbonylamino group, e.g., ethoxycarbonylamino group etc., or the phenyl group;

$Y_3$ and $Y_6$ can each represent a hydrogen atom, or $Y_3$ can represent a group of atoms necessary to form a benzene ring by linking to $Y_2$, and $Y_6$ can represent a group of atoms necessary to form a benzene ring by linking to $Y_5$.

$Y_2$ and $Y_1$, and $Y_5$ and $Y_4$ each may form a benzene ring, with the proviso that both of $Y_3$-$Y_2$ and $Y_2$-$Y_1$ each do not form a benzene ring at the same time and with proviso that the further both of $Y_6$ $Y_5$ and $Y_5$ $Y_4$ each do not form a benzene ring at the same time;

$R_1$ and $R_2$ can each represent an alkyl group e.g. methyl group, ethyl group, n-propyl group etc., a substituted alkyl group conventionally employed inthe cyanine dye sensitizing art, e.g., hydroxyalkyl group, e.g. 2-hydroxyethyl group, 4-hydroxybutyl group etc., acetoxyalkyl group, e.g., 2-acetoxyethyl group, 3-acetoxypropyl group etc., alkoxyalkyl group, e.g. 2-methoxyethyl group, 4-butoxy butyl group etc., a carboxy group containing alkyl group, e.g., 2-carboxyethyl group, 3-carboxypropyl group, 2-(2-carboxyethoxy)ethyl group etc., a sulfo group containing an alkyl group, e.g., 2-sulfoethyl group, 3-sulfopropyl group, 3-sulfobutyl group, 4-sulfobutyl group, 2-hydroxy-1-sulfopropyl group, 2-(3-sulfopropoxy)ethyl group, 2-acetoxy-1-sulfopropyl group, 3-methoxy-2-(3-sulfopropoxy)propyl group, 2-(2-(3-sulfopropoxy)ethoxy)ethyl group, 2-hydroxy-3-(3'-sulfopropoxy)propyl (I)

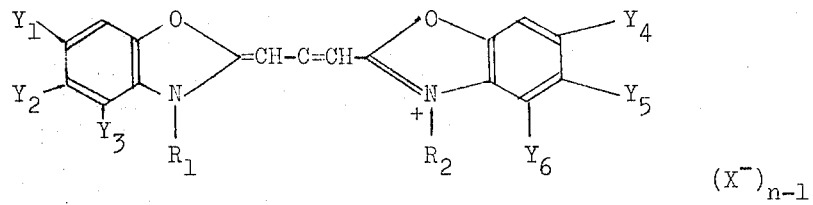

$(X^-)_{n-1}$ wherein R represents a hydrogen atom or lower alkyl group, e.g., methyl group or ethyl group;

$Y_1$ and $Y_4$ can each represent a hydrogen atom, a lower alkyl group, e.g., methyl group or ethyl group, halogen atom, e.g., chlorine atom or bromine atom etc., hydroxyl group, alkoxyl group, alkoxyl group, e.g., methoxy group or ethoxy group etc., amino group, e.g., amino group or methylamino group etc., acylamino group, e.g., acetamide group etc., acyloxy group, e.g., group, etc., a benzyl group, a phenylethyl group, a p-sulfobenzyl group, p-carboxybenzyl group, a p-sulfophenethyl group, or an allyl group; at least one of $R_1$ and $R_2$ being a carboxyl group containing alkyl group or a sulfo group containing alkyl group;

X represents an anion e.g. chloride, bromide, iodide, thiochanate, sulfonate, perchlorate, p-toluenesulfonate, methylsulfonate and ethyl sulfate etc.;

$n$ represent 1 or 2.

(II)

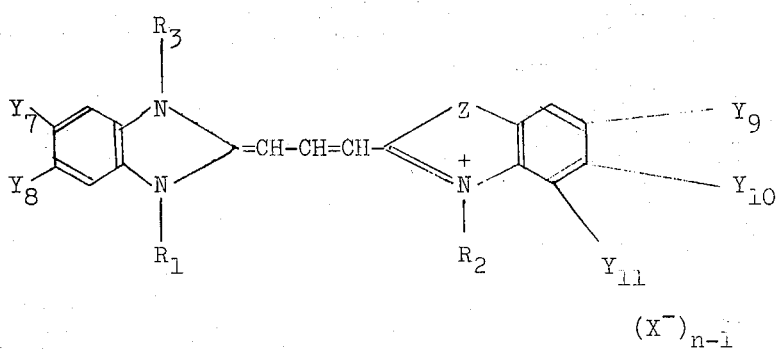

wherein Z represents –O– or

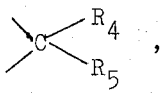

wherein $R_4$ and $R_5$ each represent an alkyl group preferably having upto 4 carbon atoms e.g. methyl group, ethyl group, etc.;

$R_3$ represents a lower alkyl group, e.g. methyl group, ethyl group, etc., or an allyl group;

$Y_7$ represents a hydrogen atom or halogen atom, e.g., chlorine atom, bromine atom, fluorine atom;

$Y_8$ represents a hydrogen atom halogen atom, e.g., chlorine atom, bromine atom, fluorine atom, etc., alkoxy group, e.g., methoxy group, ethoxy group, etc., amino group, e.g., amino group, methyl amino group, etc., acylamido group, e.g., acetamido group, etc., acyloxy group, e.g., acetoxy group, etc., or alkoxycarbonylamino group, e.g., ethoxycarbonylamino group, etc;

$Y_9$ represents a hydrogen group, a lower alkyl group, e.g., methyl group, ethyl group, etc., halogen atom, e.g., chlorine atom, bromine atom, etc., a hydroxyl group, or an alkoxy group, e.g., methoxy group, ethoxy group, etc.

$Y_{10}$ represents a hydrogen atom, a lower alkyl group, e.g., methyl group, ethyl group etc., halogen atom e.g., chlorine atom, bromine atom, fluorine atom, etc., an alkoxy group, e.g., methoxy group, ethoxy group, etc., the phenyl group, e.g. phenyl group, p-sulfophenyl group, etc., carboxyl group, alkoxycarbonyl group, e.g., methoxycarbonyl group, ethoxycarbonyl group, etc., cyano group or trifluoromethyl group;

$Y_{11}$ represents a hydrogen atom or a group of atoms necessary to form a benzene ring together with $Y_{10}$;

$Y_9$ and $Y_{10}$ may form a benzene ring with the proviso that both of $Y_9$-$Y_{10}$ and $Y_{10}$-$Y_{11}$ each do not form a benzene ring at the same time;

$R_1, R_2, X$ and $n$ each can have the same meaning as in formula (I).

(III)

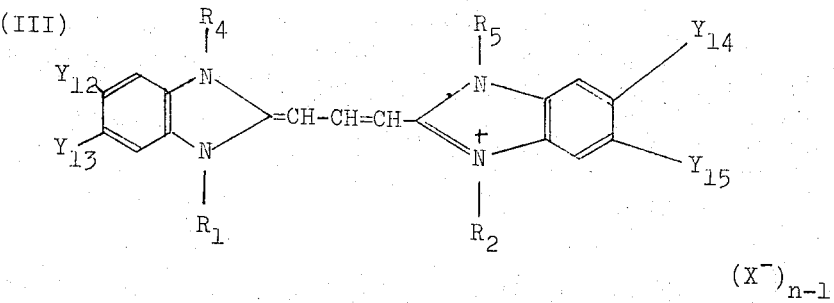

Wherein, $R_4$ and $R_5$ each can represent an alkyl group e.g. methyl group, ethyl group, propyl group, butyl group, etc., $Y_{12}$ and $Y_{14}$ represent a hydrogen atom or halogen atom e.g., chlorine atom, bromine atom, iodine atom, fluorine atom;

$Y_{13}$ and $Y_{15}$ each represent a hydrogen atom, halogen atom, e.g., chlorine atom, bromine atom, iodine atom and fluorine atom, an alkoxy group, e.g., methoxy group, ethoxy group, butoxy group, etc., an amino group, e.g., amino group, methyl amino group, dimethylamino group, etc., an acylamido group, e.g., an acetamido group etc., an acyloxy group e.g. acetoxy group etc., an alkoxycarbonylamino group, e.g., ethoxycarbonylamino group, etc., a cyano group, trifluoromethyl group, alkyl sulfonyl group, e.g., methylsulfonyl group, etc., a sulfomyl group, alkylaminosulfonyl group, e.g., ethylaminosulfonyl group diethylaminosulfonyl group, etc., a morpholinosulfonyl group, or pyperidinosulfonyl group, etc.;

$R_1, R_2, X$ and $n$ each have the same meaning as in formula (I).

(IV)

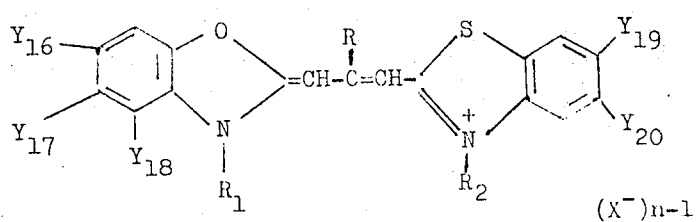

wherein, R represents a hydrogen atom or a lower alkyl group e.g., methyl group, ethyl group, etc.; $Y_{16}$ represents a hydrogen atom, a halogen atom, e.g., chlorine atom etc., or a lower alkyl group, e.g., methyl group, ethyl group, etc., $Y_{17}$ represents a hydrogen atom, a halogen atom, e.g., chlorine atom etc., an alkyl group eg., methyl group, ethyl group, propyl group, etc., an alkoxy group, e.g., methoxy group, ethoxy group, phenyl group etc.; $Y_{18}$ represents a hydrogen atom or a group of atoms necessary to form a benzene ring together with $Y_{17}$; $Y_{19}$ and $Y_{20}$ each represent a hydrogen atom; a halogen atom, e.g., chlorine atom, bromine atom, etc., a lower alkyl group, e.g., methyl group, ethyl group, etc., or an alkoxy group, e.g., methoxy group, ethoxy group etc,;

$R_1$, $R_2$, X and $n$ each can have the same meaning as in formula (I).

(V)

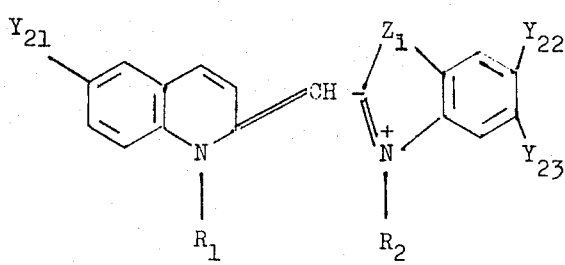

$(X^-)_{n-1}$

Wherein $Y_{21}$ represents a hydrogen atom, hydroxyl group, a lower alkyl group, e.g., methyl group, ethyl group, etc., a halogen atom, e.g., chlorine atom, etc., or an alkoxy group, e.g., methoxy group, ethoxy group, etc; $Y_{22}$ represents a hydrogen atom, a lower alkyl group, e.g., methyl group, ethyl group, etc.; $Y_{23}$ represents a hydrogen atom, a lower alkyl group, e.g., methyl group, ethyl group, etc.; an alkoxy group, e.g., methoxy group, etc.; a hydroxy group, or a phenyl group; wherein Z represents an atomic group necessary to complete a 5-membered heterocyclic ring;

$R_1$, $R_2$, X and $n$ each have the same meaning as in formula (I).

(VI)

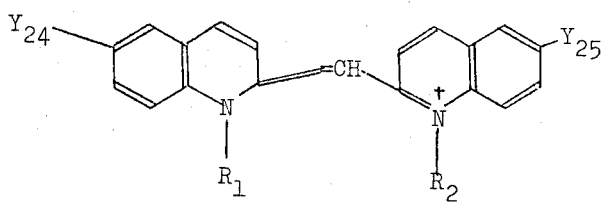

$(X^-)_{n-1}$

Wherein $Y_{24}$ and $Y_{25}$ each represent a hydrogen atom, a lower alkyl group, e.g., methyl group, ethyl group, etc., an alkoxy group, e.g., methoxy group, ethoxy group, etc., or a halogen atom, e.g., chlorine atom, bromine atom, etc;

$R_1$, $R_2$, X and n each have the same meaning as in formula (I).

Merocyanine dyes as referred to in C. K. Mees, "The Theory of The Photographic Process", Revised Edition, pp,445, lines 9 to 10 up may be also employed in the present invention. Dye represented by Formula (I) and (III) are described in French Pat. No. 1,108,788 (Sept. 14, 1955), U.S. Pat. No. 2,503,776 (Apr. 11, 1950), U.S. Pat. No. 2,912,329 (Nov. 10, 1959) and U.S. Pat. No. 3,397,060, and can easily be synthetized by persons skilled in the art with reference to the above-mentioned patent specifications or by methods similar to those described in those patent specifications.

Dyes represented by the formula (II) are described in U.S. Pat. No. 3,364,031 (Jan. 16, 1968), and Jap. Pat. Pub. No. Sho 44-14030 (Jan. 18, 1966), dyes represented by the formula (IV) are described in Jap. Pat. Pub. No. Sho 43-16169, dyes represented by the formula (V) are described in West Germany Offenlegungsschrift No. 1,936,262 (July 16, 1968), and dyes represented by the formula (VI) are described in West Germany Offenlegungsschrift No. 2,014,896 and can easily be synthetized by persons skilled in the art with reference to the above-mentioned patent specification, or by methods similar to those described in said patents.

The following are specific examples of J-band sensitizing dyes used in the present invention, but the sensitizing dyes used in the present invention should not be considered as limited thereto.

Dye 1
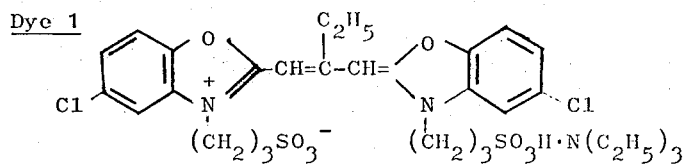
Dye 2
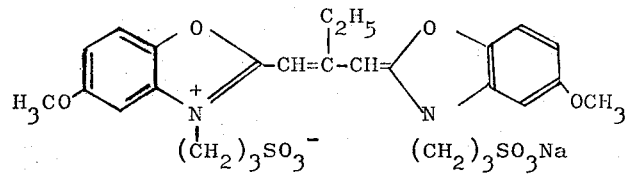
Dye 3
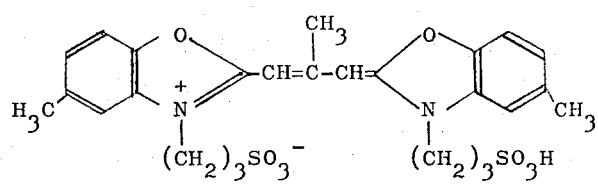
Dye 4
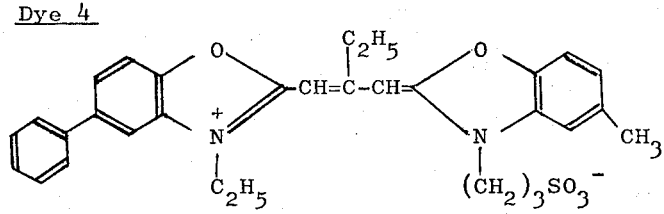
Dye 5
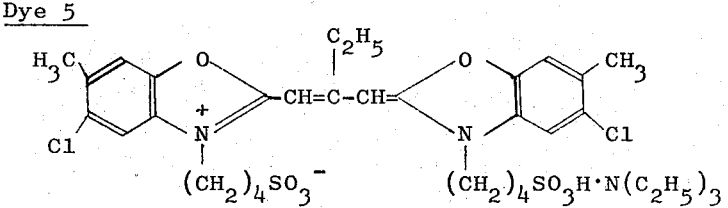
Dye 6
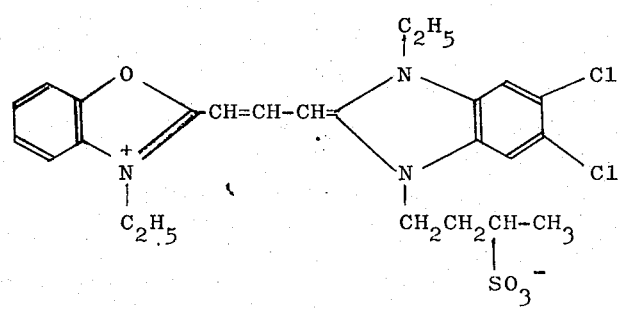
Dye 7
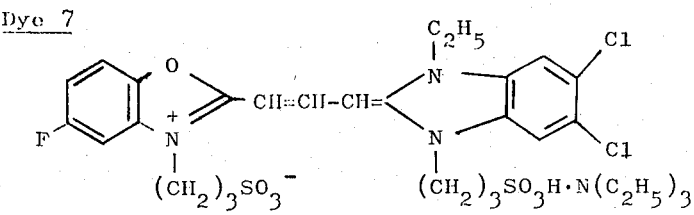

Dye 5'
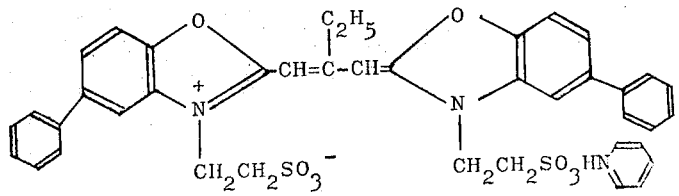
Dye 8
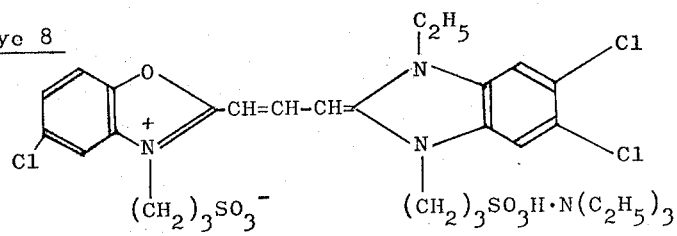
Dye 9
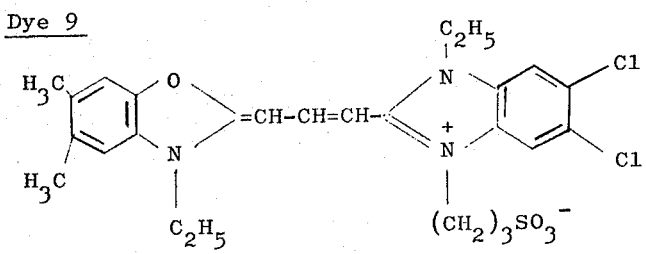
Dye 10
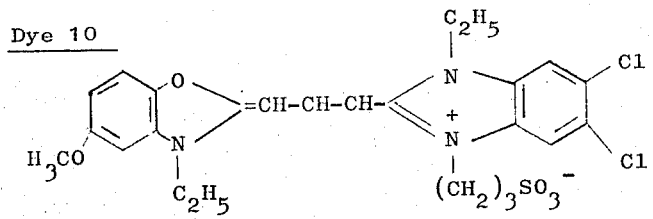
Dye 11
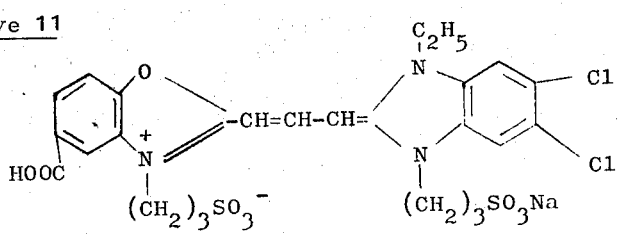
Dye 12
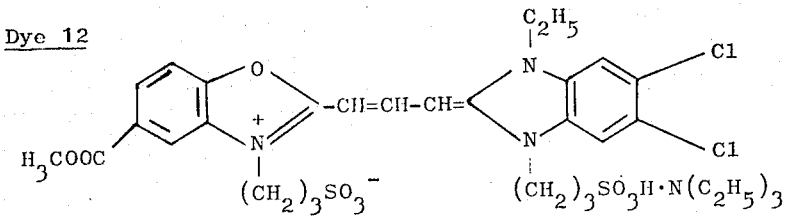
Dye 13
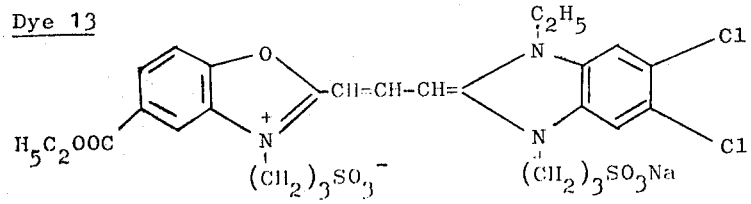

Dye 14
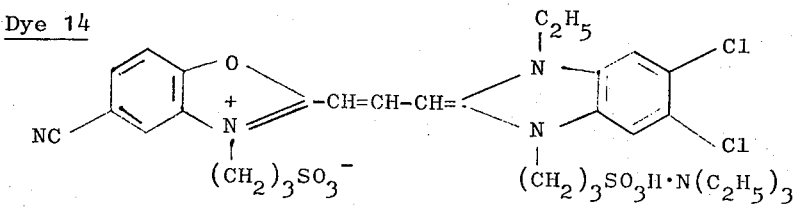
Dye 15
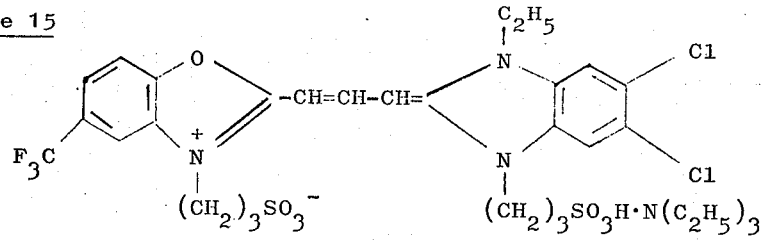
Dye 16
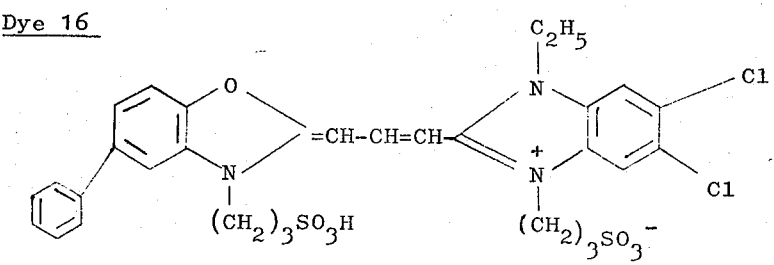
Dye 17
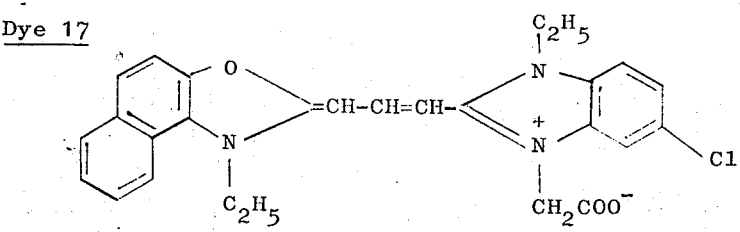
Dye 18
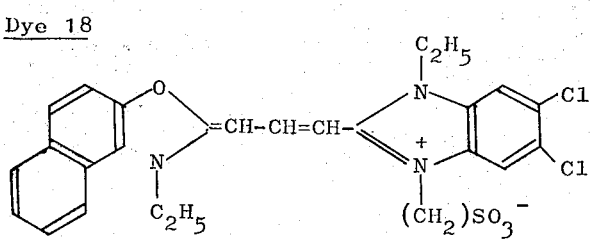
Dye 19
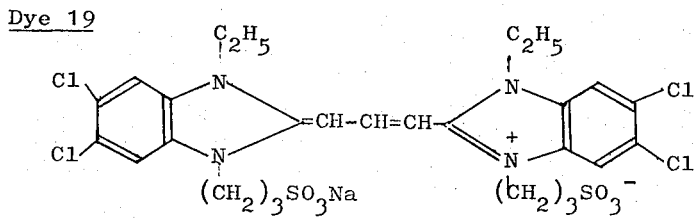
Dye 20
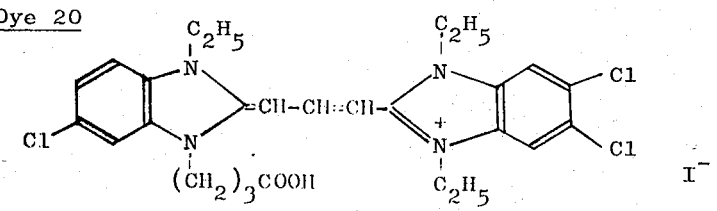

Dye 21
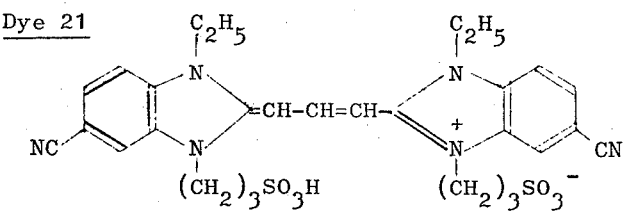
Dye 22
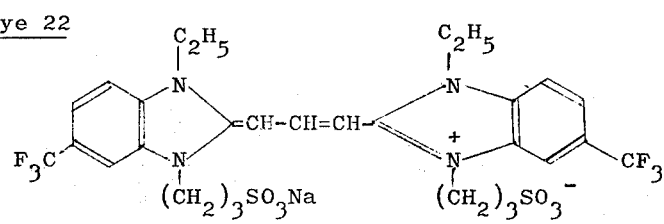
Dye 23
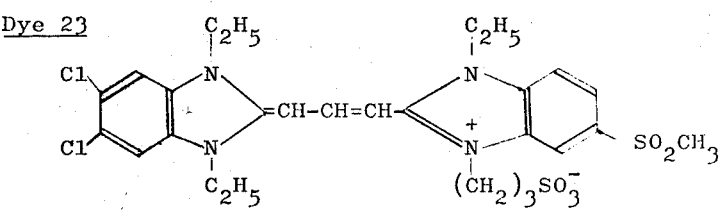
Dye 18'
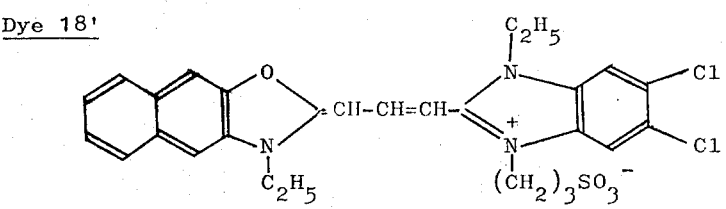
Dye 24
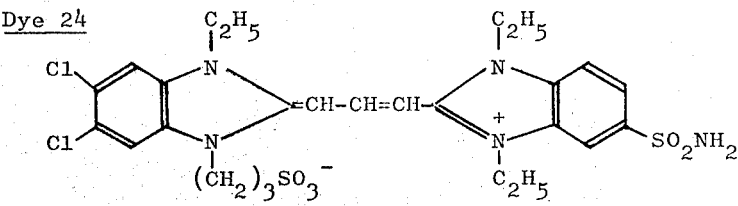
Dye 25
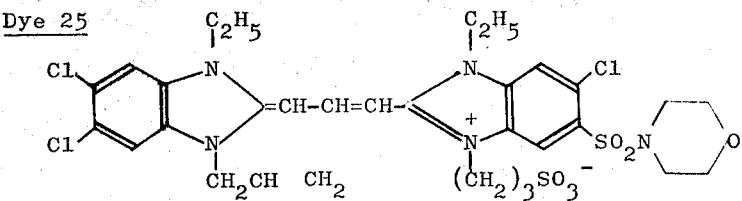
Dye 26
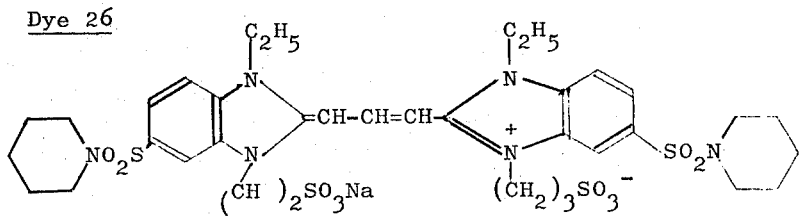
Dye 27
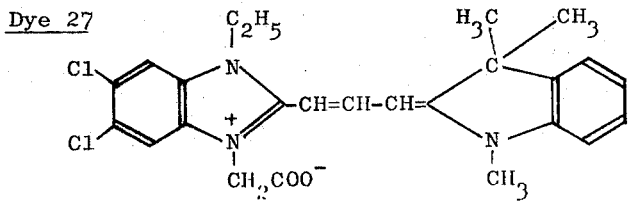

Dye 28
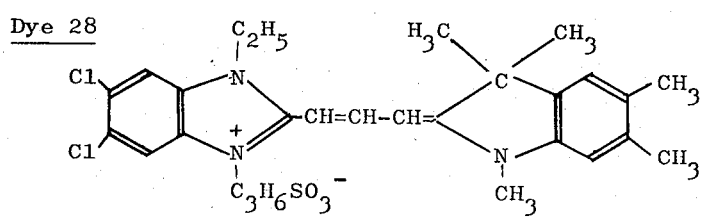
Dye 29
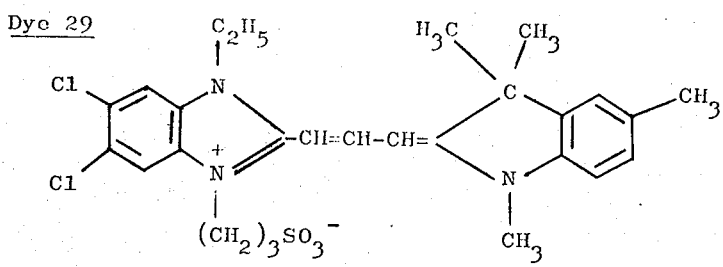
Dye 30
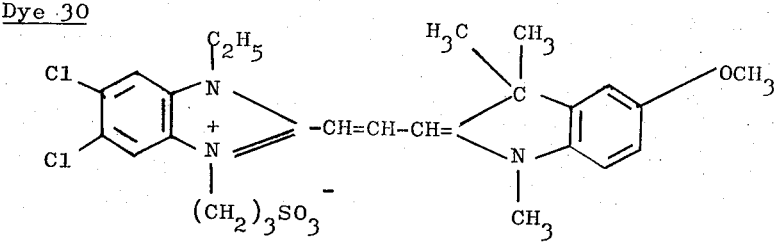
Dye 31
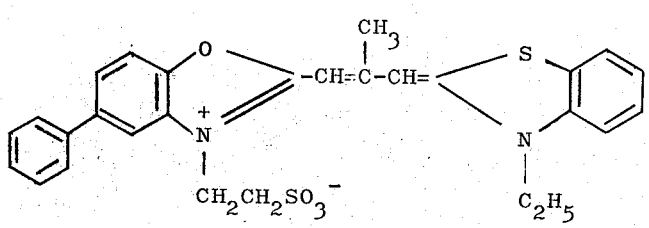
Dye 32
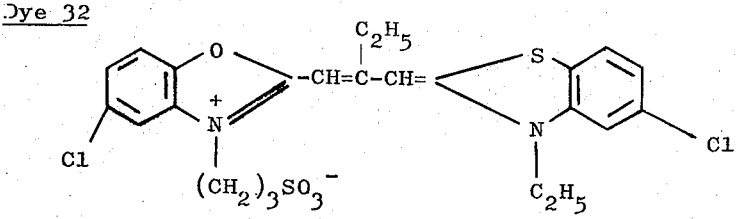
Dye 33
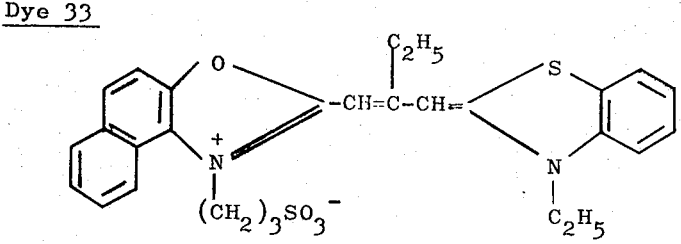

Dye 34

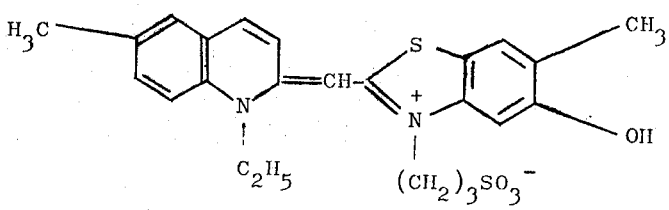

Dye 35

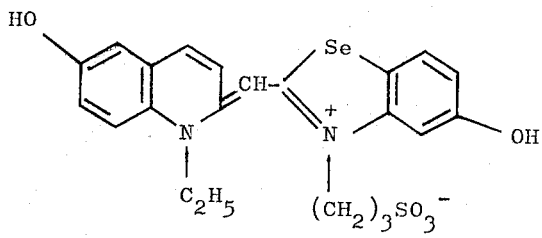

Dye 36

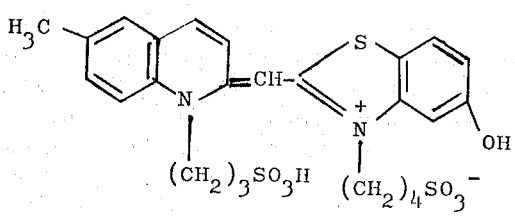

Dye 37

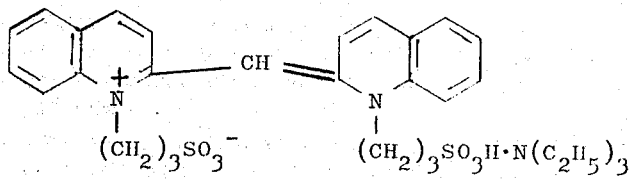

The sensitizing dyes are preferably used in an amount of 0.005 – 2.0g/(per one gram mole of silver halide) in the present invention. The addition of the sensitizing dyes to emulsions is carried out by methods well-known in this field. Usually, they are added as an aqueous solution or as a solution in organic solvents such as methanol and ethanol. Further, water insoluble sensitizing dyes as described in British Pat. No. 1,154,781 can be added as a dispersion in an aqueous colloid.

In the present invention, a gelatin silver halide emulsion is usually used. However, other hydrophilic binders such as resinous materials and cellulose derivatives which do not have a harmful influence upon the sensitive material can be used instead of gelatin.

The photographic emulsions used in the present invention may include a chemical sensitizing agent, a fog inhibitor, a stabilizer, a hardening agent, a coating assistant, a plasticizer, a development accelerator, an air fog inhibitor, color couplers, etc.

The photographic emulsions may be applied to any suitable support such as glass, films or cellulose derivatives, synthetic resin films, synthetic papers, baryta paper and polyolefin coated photographic papers by common art methods.

Color couplers which react with the oxidation product of color developing agents to produce a dye such as cyan, yellow and magenta, used in the present invention include, for example, water soluble type couplers and oil-protected type couplers represented by the following formulae which are described in U.S. Pat. No. 2,600,788, British Pat. No. 904,852 and Japanese Pat. Publication No. Sho 40-6031. These are all well known compounds.

(1) 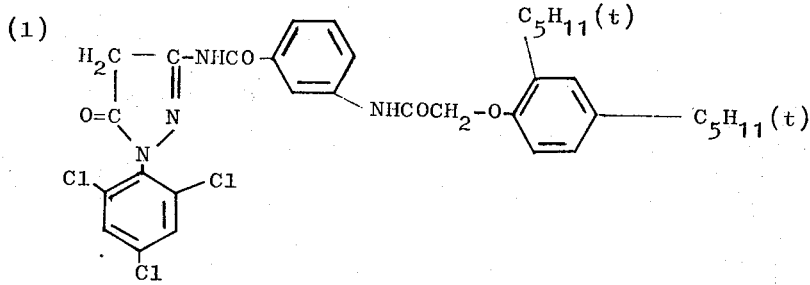
(2) 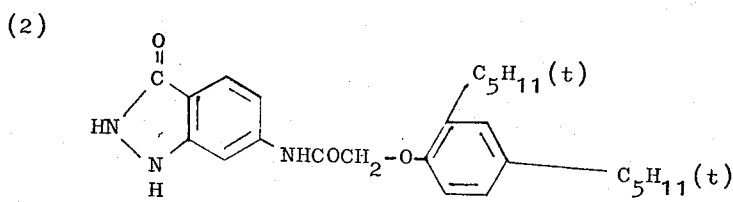
(3) 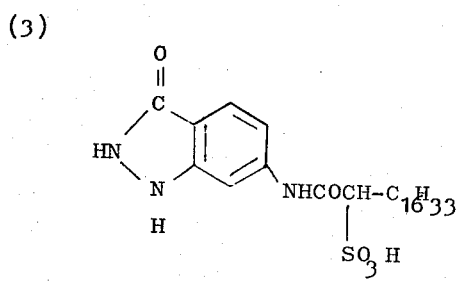
(4) 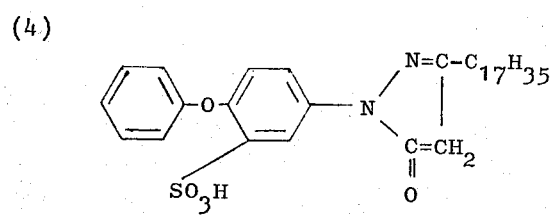
(5) 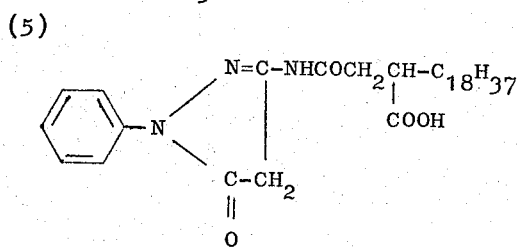
(6) 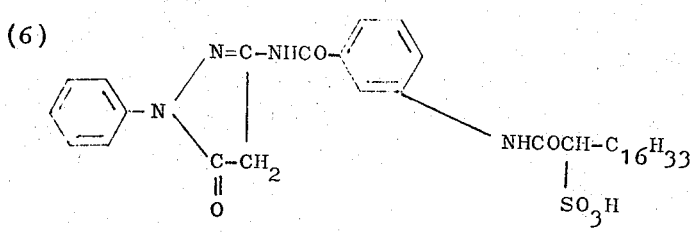
(7) 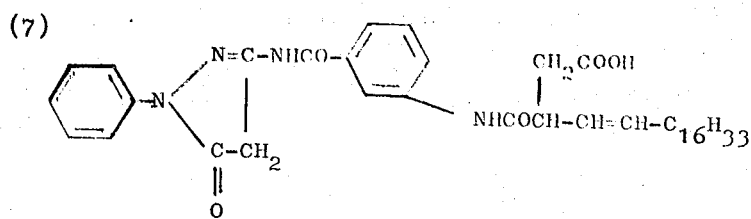

(8) 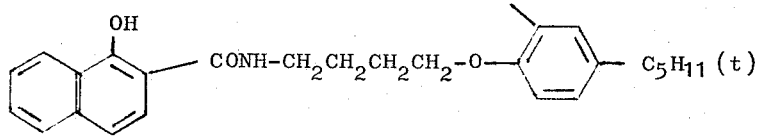
(9) 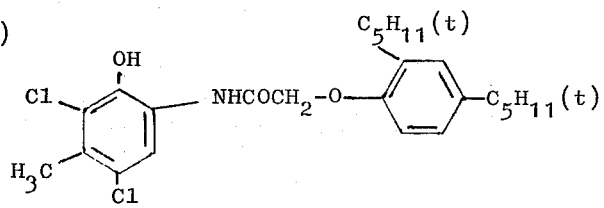
(10) 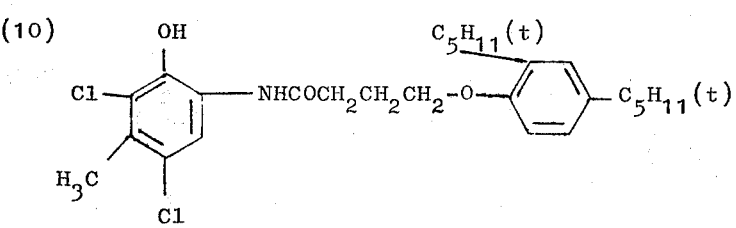
(11) 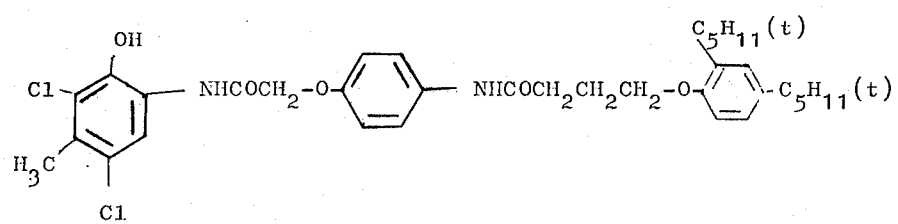
(12) 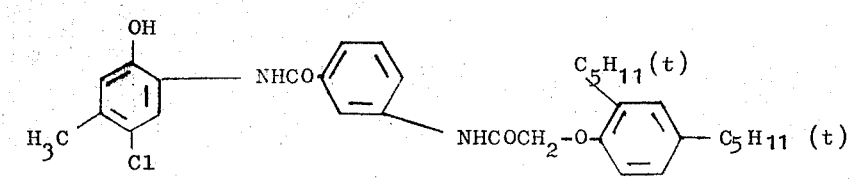
(13) 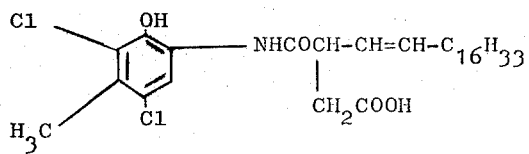
(14) 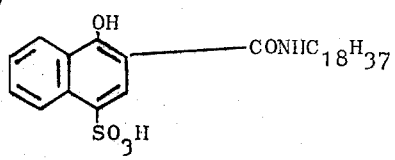

(15)
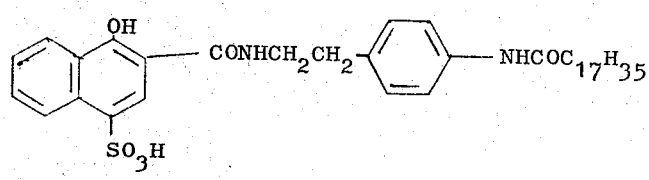
(16)
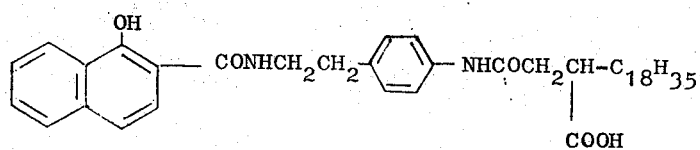
(17)
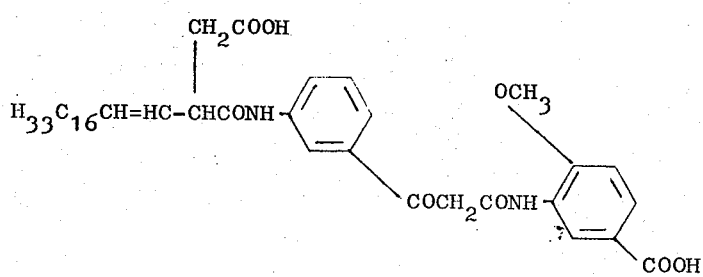
(18)
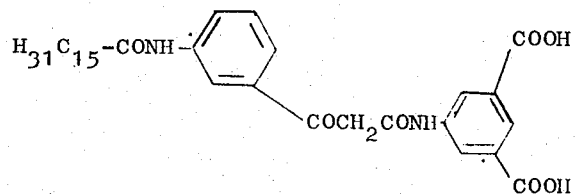
(19)
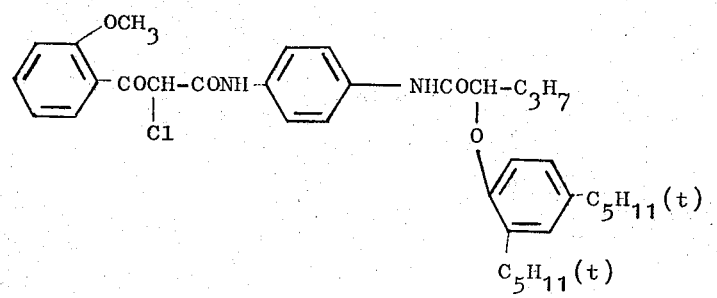
(20)
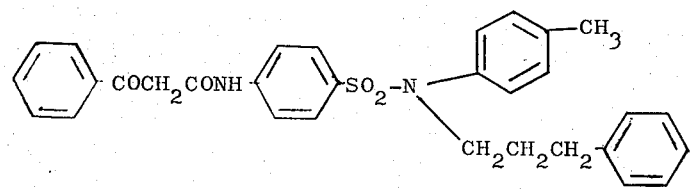
(21)
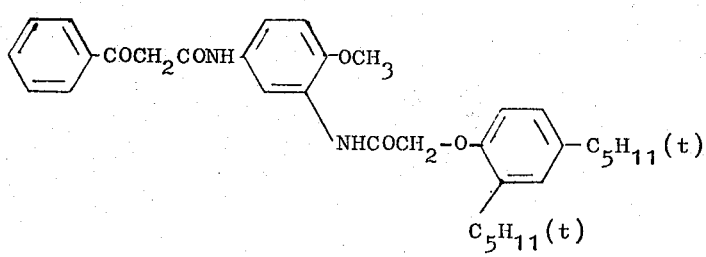

(22)

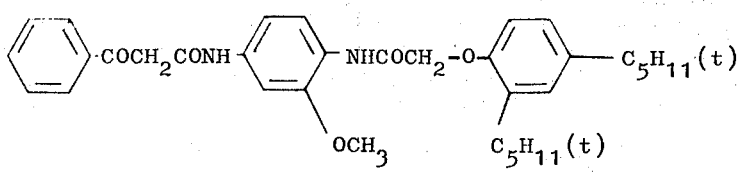

EXAMPLES 1 – 3

A sensitizing dye was added to an emulsion prepared by the following formulation, and after substantial completion of chemical ripening. Then, after adding as aqueous solution of potassium iodide, the resulting mixture was applied to a cellulose triacetate base. Preparation and formulation of emulsion:

| I | Gelatin | 20 g |
| | Sodium chloride | 1.0 g |
| | Water | 800 ml |
| II | Silver nitrate | 100 g |
| | Water | 600 ml |
| III | Potassium bromide | 21 g |
| | Sodium chloride | 25.8 g |
| | Water | 600 ml |
| IV | 1N aqueous sodium carbonate solution | 7.0 ml |
| | Water | 1600 ml |
| V | Gelatin | 180 g | solution II and Solution III were added at the same time to Solution I at 60°C over a 20 minute period. After ripening at 60°C for 5 minutes, the temperature was brought down to 40°C, and dilute sulfuric acid was added so as to lower the pH (to about pH 3.5 – 4). After adding a flocculating agent, "Nekal A" and washing, Solution IV and then Solution V were added, and the silver halide was dispersed again. The resulting emulsion was ripened at 55°C till it reached optimum sensitivity (about 60 minutes) (chemical ripening).

The coated samples were dried and exposed through a Fuji K filter No. 3 (trade mark) and a light wedge for one second using a tungsten lamp as the light source. The Fuji K filter No. 3 is a yellow filter which passes rays of above approximately 510 nm. The exposed samples were developed at 20°C for 4 minutes using the following developing solution. Formulation of developing solution:

| Metol | 0.31 | g |
| Anhydrous sodium sulfite | 39.6 | g |
| Hydroquinone | 6.0 | g |
| Anhydrous sodium carbonate | 18.7 | g |
| Potassium bromide | 0.86 | g |
| Citric acid | 0.68 | g |
| Potassium metabisulfite | 1.5 | g |
| Water | 1 | liter |

After fixing, washing and drying, the optical density was determined with a desensitometer. The results were shown in Table 1. The sensitizing dye used was Dye 1, which was added in the amount of 40 ml per kg of the emulsion as a methanol solution having a $10^{-3}$ mols/liter concentration.

Table 1

| Example No. | Amount of I⁻ per gram atom of silver | I⁻/AgCl (molar ratio) | Yellow sensitivity (relative value) | |
| | | | Just after application | After 5 days at 40°C and 80 % relative humidity |
| --- | --- | --- | --- | --- |
| Comparison | 0 | 0 | 100 | 25 |
| | 0.00118 | 0.00169 | 138 | 29.5 |
| | 0.00236 | 0.00337 | 407 | 120 |
| 1 | 0.00353 | 0.00500 | 2040 | 1290 |
| 2 | 0.00706 | 0.01085 | 2520 | 2000 |
| 3 | 0.01180 | 0.01690 | 2700 | 2150 |

From Table 1 it can be seen that sensitivity increases remarkably when the I⁻/AgCl ratio is above 0.005 and the sensitivity lowers by only a small degree with time.

EXAMPLES 4 – 6

A sensitizing dye was added to an emulsion prepared with the following formulation after substantial completion of chemical ripening. Then, after adding $CdI_2$, the emulsion was applied to a cellulose triacetate base. Preparation and formulation of emulsion:

| I | Gelatin | 20 | g |
| | Sodium chloride | 1.0 | g |
| | Water | 800 | ml |
| II | Silver nitrate | 100 | g |
| | Water | 600 | ml |
| III | Potassium bromide | 35 | g |
| | Sodium chloride | 18.9 | g |
| | Water | 600 | ml |
| IV | 1N aqueous sodium carbonate solution | 7.0 | ml |
| | Water | 1600 | ml |
| V | Gelatin | 180 | g |

The conditions for preparing the emulsion were the same as for Examples 1 – 3, and the condition of exposure and treatment were the same as in Examples 1 –

3. The sensitizing dye used was Dye 8, which was added in an amount of 80 ml per Kg of the emulsion as a methanol solution having a $10^{-3}$ mols/liter concentration. The results of measurements as in Example 1 are shown in Table 2.

wedge for 2 seconds using a tungsten lamp as the light source. The Fuji K filter No. 17 is a green filter having the transmittance shown in the drawing. After exposure, the samples were color-developed using a color developing solution and then they were treated in turn Table 2

| Example No. | Amount of I⁻ per gram atom of silver | I⁻/AgCl (molar ratio) | Yellow sensitivity (relative value) | |
|---|---|---|---|---|
| | | | Just after application | After 5 days at 40°C and 80% relative humidity |
| Comparison | 0 | 0 | 100 | 52 |
| | 0.00118 | 0.00236 | 316 | 63 |
| | 0.00236 | 0.00472 | 830 | 199 |
| 4 | 0.00471 | 0.00942 | 1000 | 830 |
| 5 | 0.00706 | 0.01412 | 1120 | 1120 |
| 6 | 0.00942 | 0.01884 | 1150 | 912 |

From Table 2 it also can be seen that sensitivity increases remarkably when the I⁻/AgCl ratio is above 0.005 and the sensitivity lowers by only a small degree with time.

EXAMPLES 7 – 11

A sensitizing dye was added to an emulsion prepared with the following formulation after substantial completion of chemical ripening. Then, after adding KI or KBr, a dispersion of coupler*, a hardening agent and a coating assistant were added thereto, and the mixture was then applied to baryta paper. Preparation and formulation of emulsion:

| I | Gelatin | 20 | g |
| | Sodium chloride | 1.0 | g |
| | Water | 800 | ml |
| II | Silver nitrate | 100 | g |
| | Water | 600 | ml |
| III | Potassium bromide | 49 | g |
| | Sodium chloride | 12 | g |
| | Water | 600 | ml |
| IV | 1N aqueous sodium carbonate solution | 7.0 | ml |
| | Water | 1600 | ml |
| V | Gelatin | 180 | g |

*Coupler (12) was used as the coupler.

Other conditions for preparing the emulsion were the same as in Examples 1 – 3.

The coated materials were dried and exposed through a Fuji K filter No. 17 (trade mark) and a light by the following treatments; fixing, washing, bleaching, washing, hardening, washing, stabilizing. The optical density of the treated samples was determined with a desensitometer. The results are shown in Table 3. The sensitizing dye used was dye 16, which was added in the amount of 80 ml per Kg of the emulsion as a methanol solution having a $10^{-3}$ mols/liter concentration.

(Formula of a color developing solution)

| Sodium methaborate | 25.0 g |
| Sodium sulfite | 2.0 g |
| hydroxylamine (sulfate) | 2.0 g |
| potassium bromide | 0.5 g |
| 6-nitrobenzimidazole (nitrate) | 0.02 g |
| sodium hydroxide | 4.0 g |
| benzylalcohol | 15.8 ml |
| diethylglycol | 20.0 ml |
| N-ethyl-N,β-(methanesulfoamideethyl)-p-phenylene diammine | 8.0 g |
| Water to make | 1. liter (pH 10.6) |

From Table 3 it also can be seen that sensitivity increases remarkably when the I⁻/AgCl ratio and the Br⁻/AgCl is above 0.005 and 0.01, respectively and the sensitivity lowers by only a small degree with time.

Table 3

| Example No. | Amount of I⁻ or Br⁻ per gram atom of silver | I⁻/AgCl (molar ratio) or Br⁻/AgCl (molar ratio) | Green Sensitivity | |
|---|---|---|---|---|
| | | | Just after application | After 5 days at 40°C and 80% relative humidity |
| Comparison | 0 | 0 | 100 | 7.1 |
| | I⁻0.00059 | 0.00197 | 216 | 10.8 |
| | I⁻0.00118 | 0.00393 | 354 | 28 |
| 7 | I⁻0.00236 | 0.00787 | 525 | 417 |
| 8 | I⁻0.00589 | 0.0196 | 398 | 398 |
| Comparison | 0 | 0 | 100 | 16 |
| | Br⁻0.0042 | 0.006 | 141 | 38 |
| 9 | Br⁻0.0084 | 0.012 | 178 | 118 |
| 10 | Br⁻0.0280 | 0.040 | 204 | 200 |
| 11 | Br⁻0.0840 | 0.120 | 184 | 174 |

EXAMPLES 12 – 19

A sensitizing dye was added to an emulsion prepared with the following formulation after substantial completion of chemical ripening. Then, after adding KI, a dispersion of a coupler* a hardening agent and a coating aid were added thereto, and then the mixture was applied to a polyethylene coated paper base.

*Coupler (1) was used as the coupler.

| | | | |
|---|---|---:|---|
| I | Gelatin | 20 | g |
| | Sodium chloride | 1.0 | g |
| | Water | 800 | ml |
| II | Silver nitrate | 100 | g |
| | Water | 600 | ml |
| III | Potassium bromide | 63 | g |
| | Sodium chloride | 5.2 | g |
| | Water | 600 | ml |
| IV | 1N aqueous sodium carbonate solution | 7.0 | ml |
| | Water | 1600 | ml |
| V | Gelatin | 180 | g |

Other conditions of preparing the emulsion were the same as in Example 1 – 3.

Coated samples were dried and exposed through a Fuji K filter No. 17 and a light wedge for one-millionth of a second using a Mark VII sensitometer produced by EG & G Co. (U.S.A.). After exposure the samples were color-developed using a color developing solution, and then they were treated by the following treatments in turn:, fixing, washing, bleaching, washing, hardening, washing and stabilizing. The optical density of the treated samples was determined with a desensitometer. The results are shown in Table 4. The sensitizing dye used was Dye 2, which was added in the amount of 40 ml per Kg of the emulsion as a methanol solution having a $10^{-3}$ mols/liter concentration.

that sensitivity increases remarkably when the $I^-/AgCl$ ratio is above 0.005 and no greater than 0.1 and the sensitivity loweres by only a small degree with time.

What is claimed is:

1. In a photographic silver halide emulsion green-sensitized by at least one J-band sensitization type trimethine cyanine dye, wherein at least one of the nitrogen containing heterocyclic nuclei of said dye has, on the nitrogen atom thereof, a —RCOOH group wherein R is an alkylene group, or a sulfoalkyl group, the improvement wherein said J-band sensitization type dye is present in a binder dispersion of silver clorobromide containing a water soluble iodide in a molar ratio of 0.005–0.10, based upon silver chloride which is a component of said silver chlorobromide.

2. A photographic silver halide emulsion as claimed in claim 1 wherein the J-band sensitization type dye is selected from dyes represented by the general formula (I), (II), (III), (IV), (V) or (VI):

General Formula (I)

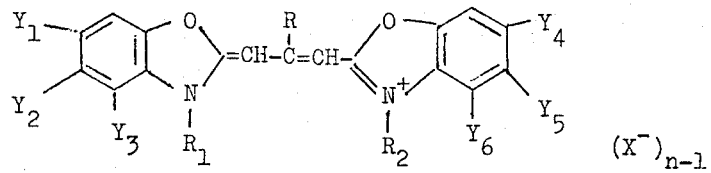

wherein

R represents a hydrogen atom or lower alkyl group, $Y_1$ and $Y_4$ each represent a hydrogen atom, lower alkyl group, halogen atom, hydroxyl group, alkoxyl group, amino group, acylamino group, acyloxy group, carboalkoxy group, or alkoxycarbonylamino group;

$Y_2$ and $Y_5$ each represent a hydrogen atom, lower alkyl group, halogen atom, hydroxyl group, alkoxy group, amino group, acylami o group, acyloxyl group, carbalkoxy group, alkoxycarbonylamino group, or the phenyl group;

$Y_3$ and $Y_6$ each represent a hydrogen atom, or $Y_3$ can represent a group of atoms necessary to form a benzene ring by linking to $Y_2$, and $Y_6$ can represent a group of atoms necessary to from a benzene ring by linking to $Y_5$;

Table 4

| Example No. | Amount of $I^-$ per gram atom of silver | $I^-/AgCl$ (molar ratio) | Green sensitivity Just after application | after 5 days at 40°C and 80% relative humidity |
|---|---|---|---|---|
| Comparison | 0 | 0 | 100 | 23 |
| | 0.00030 | 0.0030 | 141 | 55 |
| 12 | 0.00059 | 0.0059 | 317 | 307 |
| 13 | 0.00118 | 0.0118 | 1000 | 1380 |
| 14 | 0.00236 | 0.0236 | 1870 | 2000 |
| 15 | 0.00353 | 0.0353 | 2000 | 2200 |
| 16 | 0.00471 | 0.0471 | 2190 | 2400 |
| 17 | 0.00589 | 0.0589 | 2240 | 2570 |
| 18 | 0.00706 | 0.0706 | 1660 | 1580 |
| 19 | 0.00942 | 0.0942 | 2220 | 1770 |
| Comparison | 0.01178 | 0.1178 | 2100 | 1320 |

The color developing solution has the same formula as in Examples 7 to 11. From Table 4 it can also be seen $Y_2$ and $Y_1$, and $Y_5$ and $Y_4$ each may form a benzene ring with the proviso that both of $Y_3$-$Y_2$ and $Y_2$-$Y_1$ each do not form a benzene ring at the same time and with the further proviso that both of $Y_6$-$Y_5$ and $Y_5$-$Y_4$ each do not form a benzene ring at the same time;

$R_1$ and $R_2$ each represent an alkyl group or a substituted alkyl group conventionally employed in the cyanine dye-sensitizing art, at least one of $R_1$ and $R_2$ being a —RCOOH group wherein R is alkylene, or a sulfoalkyl group X represents an anion;

and $n$ represents 1 or 2:

$Y_9$ represents a hydrogen group, a lower alkyl group, halogen atom, a hydroxyl group, or an alkoxy group;

$Y_{10}$ represents a hydrogen atom, a lower alkyl group, halogen atom, an alkoxy group the phenyl group, carboxyl group, alkoxy carbonyl group, cyano group, or trifluoromethyl group, $Y_{11}$ represents a hydrogen atom or a group of atoms necessary to form a benzene ring together with $Y_{10}$;

$Y_9$ and $Y_{10}$ may form a benzene ring with proviso that both of $Y_9$-$Y_{10}$ and $Y_{10}$-$Y_{11}$ each do not form a benzene ring at the same time;

$R_1$, $R_2$, X and $n$ each have the same meaning as in formula (I):

General Formula (II)

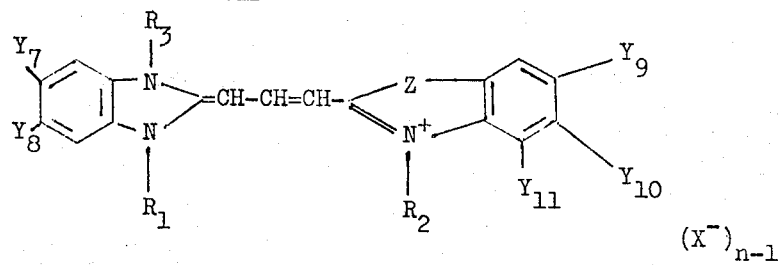

General Formula (III)

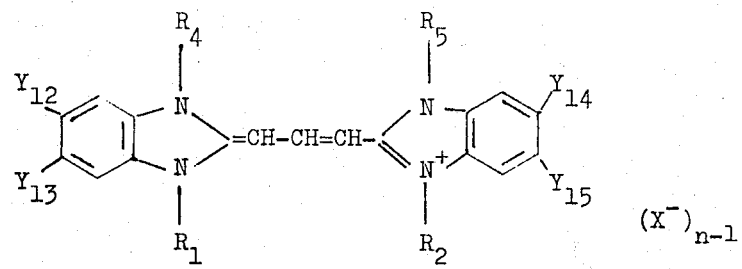

wherein Z represents —O— or

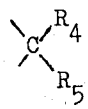

wherein
$R_4$ and $R_5$ each represent an alkyl group;
$R_3$ represents a lower alkyl group or an allyl group;
$Y_7$ represents a hydrogen atom or halogen atom;
$Y_8$ represents a hydrogen atom, halogen atom, alkoxy group, amino group, acylamido group, acetoxy group, or alkoxycarbonyl amino group;

wherein
$R_4$ and $R_5$ each represent an alkyl group;
$Y_{12}$ and $Y_{14}$ each represent a hydrogen atom or halogen atom;
$Y_{13}$ and $Y_{15}$ each represent a hydrogen atom, halogen atom, an alkoxy group, an amino group, an acylamido group, an acyloxy group, an alkoxy carbonylamine group, a cyano group, trifluoromethyl group, alkyl sulfonyl group, a sulfamyl group, alkylaminosulfonyl group, a morpholinosulfonyl group, or pyperidinosulfonyl group;
$R_1$, $R_2$, X and $n$ each have the same meaning as in formula (I):

General Formula (IV)

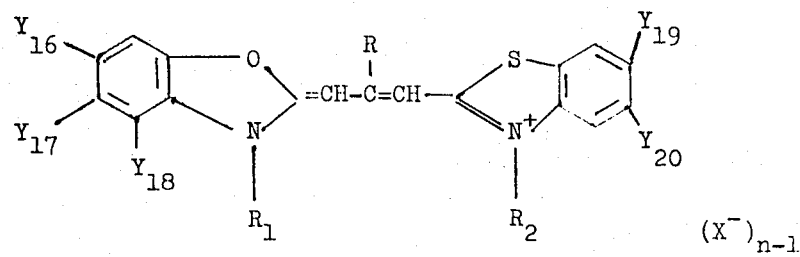

wherein

R represents a hydrogen atom or a lower alkyl group;

$Y_{16}$ represents a hydrogen atom, a halogen atom, or a lower alkyl group;

$Y_{17}$ represents a hydrogen atom, a halogen atom, an alkyl group, an alkoxy group or phenyl group;

$Y_{18}$ represents a hydrogen atom or a group of atoms necessary to form a benzene ring together with $Y_{17}$;

$Y_{19}$ and $Y_{20}$ each represent a hydrogen atom, a halogen atom, a lower alkyl group, or an alkoxy group;

$R_1$, $R_2$, X and $n$ each have the same meaning as in formula (I).

3. A photographic silver halide emulsion as claimed in claim 1 wherein the amount of silver bromide is from about 15 to about 95 molar percent.

4. A photographic silver halide emulsion as claimed in claim 3 wherein the amount of silver bromide is from 30 to 90 molar percent.

5. A photographic silver halide emulsion as claimed in claim 1 wherein an average particle size, by number, of the silver halide is less than $0.6\mu$.

6. A photographic silver halide emulsion as claimed in claim 1 wherein the silver halide particles are regular.

7. A photographic silver halide emulsion as claimed in claim 1 wherein the photographic emulsion is monodispersed.

8. A photographic silver halide emulsion as claimed in claim 1 wherein the photographic emulsion further contains a water-soluble type coupler or an oil-protected type coupler.

9. A photographic silver halide emulsion as claimed in claim 1 wherein the J-band sensitization type dye is selected from the group consisting of

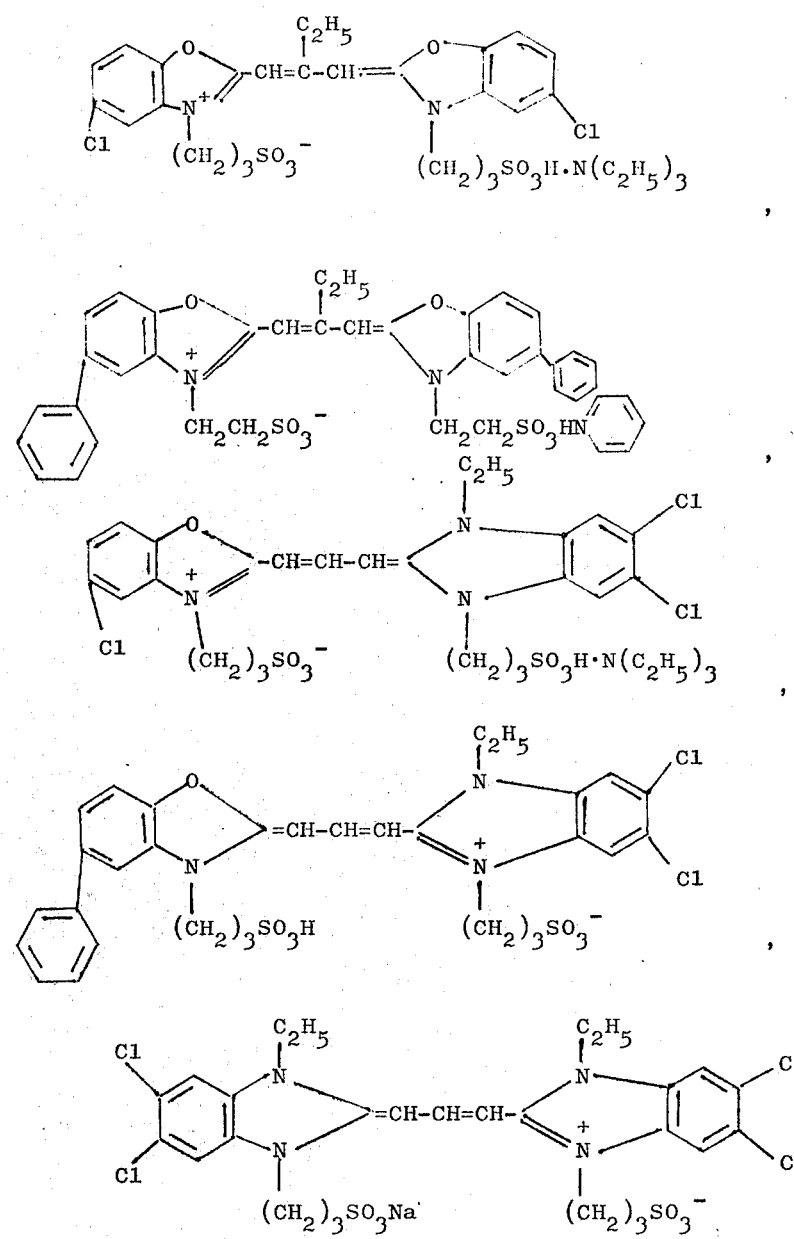

and

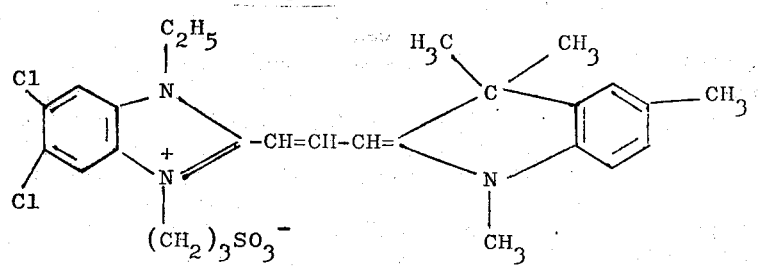

10. A photographic silver halide emulsion as claimed in claim 2, wherein said substituted alkyl group as represented by $R_1$ and $R_2$ is a member selected from the group consisting of a hydroxyalkyl group, an acetoxyalkyl group, an alkoxyalkyl group, a carboxy group containing an alkyl group, a sulfo group containing an alkyl group, a benzyl group, a phenylethyl group, a p-sulfobenzyl group, a p-carboxybenzyl group, a p-sulfophenethyl group, and an allyl group.

11. A photographic silver halide emulsion as claimed in claim 10, wherein said hydroxyalkyl group is a member selected from the group consisting of a 2-hydroxyethyl group and a 4-hydroxybutyl group; wherein said acetoxyalkyl group is a member selected from the group consisting of a 2-acetoxyethyl group and a 3-acetoxypropyl group; wherein said alkoxyalkyl group is a member selected from the group consisting of a 2-methoxyethyl group and a 4-butoxybutyl group; wherein said carboxy group containing an alkyl group is a member selected from the group consisting of a 2-carboxyethyl group, a 3-carboxypropyl group, and a 2-(2-carboxyethoxy)ethyl; and wherein said sulfo group containing an alkyl group is a member selected from the group consisting of a 2-sulfoethyl group, a 3-sulfopropyl group, a sulfobutyl group, a 4-sulfobutyl group, a 2-hydroxy-1-sulfopropyl group, a 2-(3-sulfopropoxy)ethyl group, a 2-acetoxy-1-sulfopropyl group, a 3-methoxy-2(3-sulfopropoxy)propyl group, a 2-(2-(3-sulfopropoxy)ethoxy)ethyl group, and a 2-hydroxy-3-(3'-sulfopropoxy)propyl group.

12. A method of increasing green sensitivity of a photographic silver halide emulsion which comprises incorporating in the photographic silver chlorobromide emulsion not prior to the substantial completion of chemical ripening at least one J-band sensitization type trimethine cyanine dye wherein at least one of the nitrogen containing heterocyclic nuclei of said dye has, on the nitrogen atom thereof, a —RCOOH group wherein R is alkylene, or a sulfoalkyl group, and a water soluble iodide in a molar ratio of 0.005–0.10 based upon silver chloride which is a component of said silver chlorobromide.

* * * * *